United States Patent [19]
Brannon

[11] Patent Number: 5,377,445
[45] Date of Patent: * Jan. 3, 1995

[54] LIVE BAIT DISPENSER

[76] Inventor: Roland Brannon, P.O. Box 586, Morgan City, La. 70380

[ * ] Notice: The portion of the term of this patent subsequent to May 2, 2006 has been disclaimed.

[21] Appl. No.: 344,137

[22] Filed: Apr. 27, 1989

Related U.S. Application Data

[63] Continuation-in-part of Ser. No. 64,864, Jun. 19, 1987, Pat. No. 4,825,577.

[51] Int. Cl.⁶ .......................... A01K 97/00; B67D 3/00
[52] U.S. Cl. ........................................ 43/55; 222/556
[58] Field of Search ................... 222/556; 43/55

[56] References Cited

U.S. PATENT DOCUMENTS

| | | | |
|---|---|---|---|
| 2,857,705 | 10/1958 | Woodcock | 43/55 |
| 3,739,957 | 6/1973 | Alpern | 222/556 |
| 4,815,230 | 3/1989 | Allen | 43/55 |

Primary Examiner—P. Austin Bradley
Assistant Examiner—Chuck Y. Mah
Attorney, Agent, or Firm—Keaty & Keaty

[57] ABSTRACT

The invention discloses a live bait dispenser for receiving and retaining a plurality of live baits, such as crickets and comprising devices to allow dispensing of the live bait one at a time, while preventing escape of the live bait from the dispensing area.

9 Claims, 2 Drawing Sheets

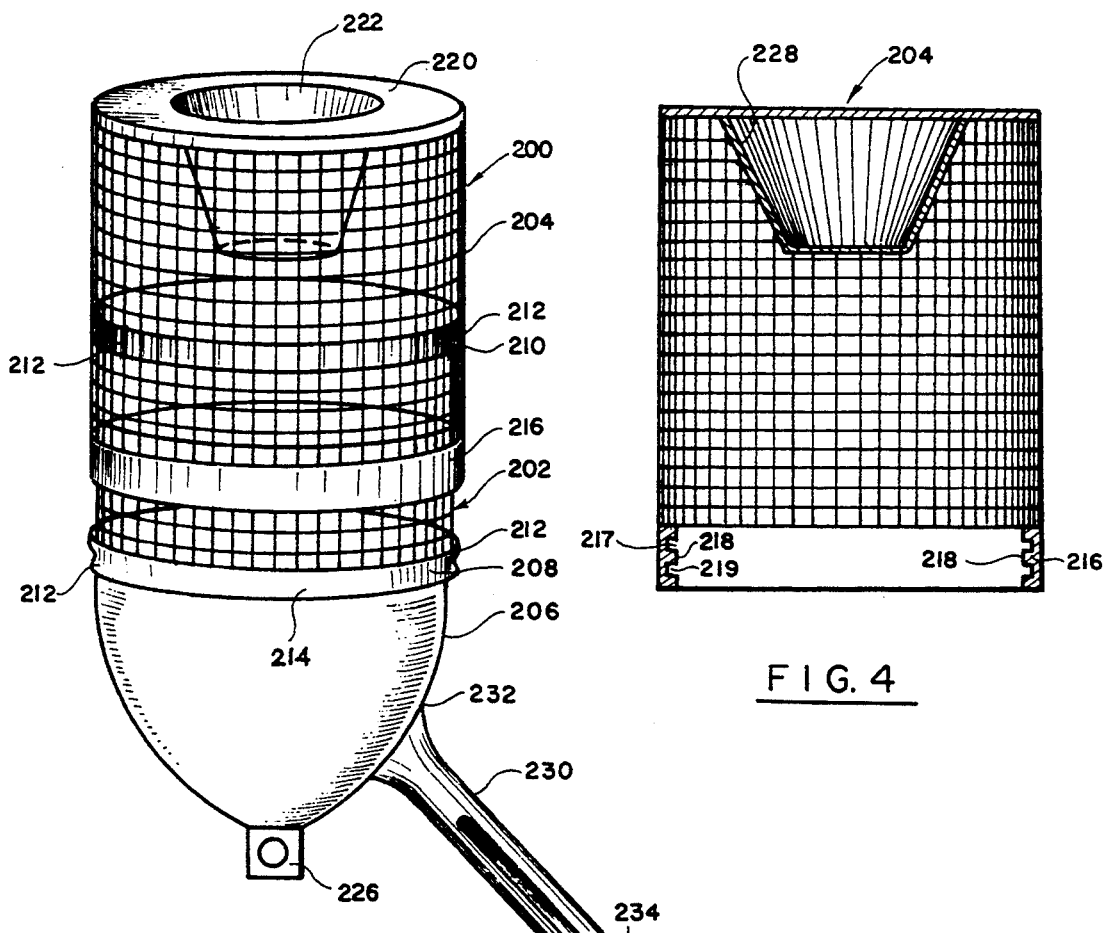
FIG. 3
FIG. 4
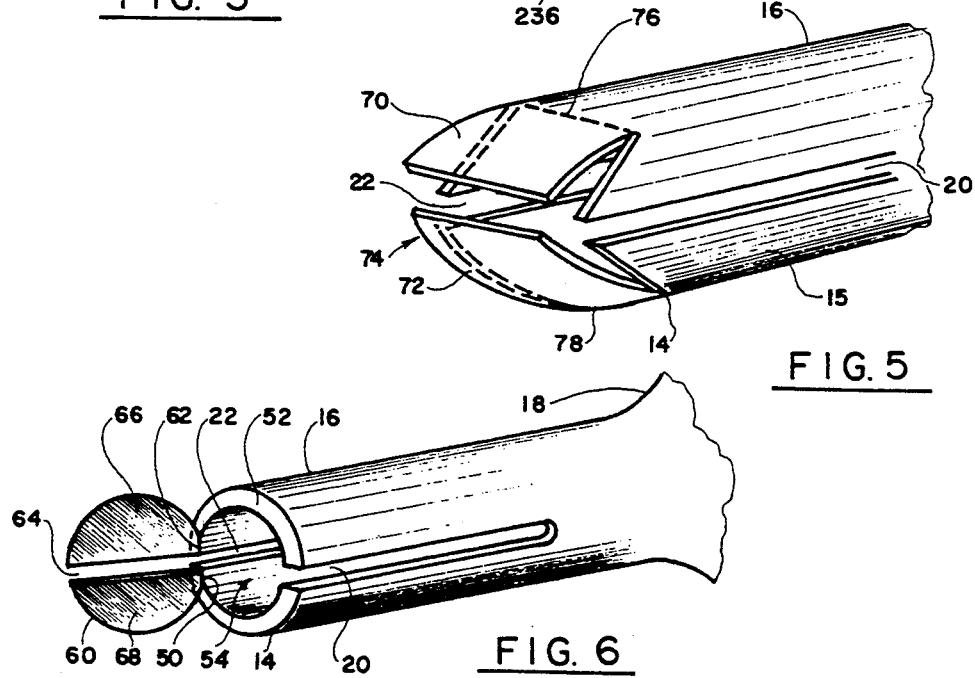
FIG. 5
FIG. 6

LIVE BAIT DISPENSER

CROSS REFERENCE TO RELATED APPLICATIONS

This application is a continuation-in-part of my copending application, Ser. No. 064,864 filed on Jun. 19, 1987 and entitled "Live Bait Dispenser", now U.S. Pat. No. 4,825,577 issued May 2, 1989, the disclosure of which is incorporated by reference herein.

BACKGROUND OF THE INVENTION

The present invention relates to bug dispensers and specifically to live cricket dispensers as used for example, by fishermen as live bait.

It is common knowledge that such live bait as crickets is rather costly and various devices have been offered on the market to reduce the number of dispensed crickets to one at a time, while reducing the possibility Of other crickets which are held in one container of escaping through an opening by which access to the holding chamber is achieved. Some of the known devices provided for a one-way access reduced diameter chamber into which a cricket would crawl and from which the fisherman would withdraw a cricket by hooking while it is still in the reduced diameter chamber. Many of these devices though suffer from one major drawback. The cricket must be manipulated by hand or the trap door, which encloses the reduced diameter chamber, must be manually operated.

Other devices provide for the use of a plug which closes the opening to the reduced diameter section, so that the plug has to be removed and the cricket is pulled out from the restricted diameter chamber.

Still other known devices allow the cricket to escape from the reduced diameter chamber into the holding chamber, thereby causing a delay in withdrawing a single cricket from the dispenser, thereby making the cricket dispenser difficult to operate and not attractive in the eyes of a fisherman.

Many of the devices have also not used the fact that crickets are incapable of climbing on a smooth surface and, once caught in a chamber which has smooth walls, are incapable of returning back to the larger holding chamber.

Another characteristic of a cricket's behavior which has not been taken into consideration previously is the fact that when the cricket moves forward, it touches objects in front of him with his antennas and, once an obstacle forming a narrow passage is sensed by its antennas, the cricket stops its movement. It has also been observed that the cricket cannot move backwards if his hind legs touch an obstacle behind the cricket.

Further disadvantages of the currently known devices lies in the fact that the dispensing containers cannot be securely held in a boat in close proximity to a fisherman, such that when the boat rolls or pitches, the dispenser, if not securely retained in a special place, rolls away from the fisherman, causing frustration and the necessity to retrieve the dispenser to continue fishing.

Further disadvantage of the now available cricket dispensers lies in the fact that the containers cannot be changed in size, depending on the amount of live bait disposed therein, thus requiring the various containers to be used, should the need arise for retaining a large amount of crickets. At the same time, should a fisherman require a small number of live crickets for any particular day, he will still have to use the larger size commercially available container, making it more difficult for the fisherman to retrieve one live bait from the container, and allowing the crickets to move more freely throughout the container, thus escaping the entrance of the dispensing conduit.

These and other disadvantages of the prior art are sought to be eliminated, and at least partially solved by the present invention.

SUMMARY OF THE INVENTION

The present invention achieves its objects by providing a live bait dispenser which has a housing adapted for receiving and retaining a plurality of live baits in an interior chamber formed in the housing. At least one live bait dispensing conduit is attached at an angle to the vertical axis of the housing, the conduit having a hingedly attached tension spring door means attached to a dispensing (distant) end of the dispensing conduit. The dispenser can be varied in size to alternatively decrease or increase the size of the interior chamber, upon demand. A pair of annular bands are positioned a distance from each other around the housing and fixedly attached to the housing. Each band is formed with a pair of outwardly extending lips separated by a groove. An extension sleeve having an interior diameter at least slightly greater than the exterior diameter of the housing is adapted for detachable securing on the housing. The extension sleeve is provided with a locking band which is carried by the interior wall of the sleeve. The locking annular band is provided with a pair of grooves separated by a lock which is adapted for locking into the groove of the alternative annular band on the exterior of the housing. By positioning the sleeve in its downwardly most position, the lower band of the housing and the locking band of the sleeve can be engaged, thus decreasing the size of the dispenser when required. Alternatively, the extension sleeve can be locked with an upper annular band of the housing, thus substantially increasing the size of the dispenser itself and, thereby, the interior chamber of the housing which receives and retains a plurality of live bait. The housing in, some of the embodiments, can be provided with means for detachable securing of the housing to a stable object, such as a side of a boat, pole and the like. The housing itself carries a securing plate which is detachably connectable to an elongated arm, the opposite end of the arm being adapted for securing to a clamp. The clamp itself is engaged with a stable object. By rotating the housing in relationship to the elongated arm, the angle of the housing can be varied, thus positioning the dispenser housing at an angle most convenient to the fisherman.

Still further embodiments provide for a special attachment device which can be used with a commercially available live bait dispenser. The dispenser is traditionally formed with a dispensing conduit which has a cylindrical shape and has an open end. The attachment device has a main body with a cylindrical and a frustoconical portions integrally connected to each other. The frustoconical portion carries an internal sleeve of an exterior diameter smaller than the interior diameter of the frustoconical portion and having an interior diameter greater than the exterior diameter of the cylindrical dispensing conduit of the live bait dispenser. A special retainer ring which is attached to one end of the interior sleeve is frictionally fitted within the frustoconical portion and retains the sleeve in its co-axial relationship to the attachment device. By positioning the attachment device in covering relationship about at least a part of the cylindrical dispensing conduit, the attachment device can be secured thereto and dispensing of the live bait is conducted through the attachment device which is conveniently provided with means to allow only one live bait at a time to crawl into the dispensing end of the device. The dispensing portion is sized and shaped to prevent the live bait unit, such as a cricket, from turning and escaping from the dispensing portion back into the dispenser housing. A hingedly attached door at the dispensing end of the attachment device allows withdrawal of one bait at a time from the device, while retaining the live bait within the attachment device as required. As can be seen in the drawings, the dispensing portion is formed generally cylindrical. As a result, the live bait, such as a single cricket, does not suffer from any compression force while it is being retained in position ready for dispensing within the dispensing end, and the live bait is not "crushed."

It is therefore an object of the present invention to provide a dispensing attachment device for use with a live bait dispenser having a dispensing conduit.

It a further object of the present invention to provide a live bait dispenser which is adapted for mounting to a stable object.

It is a further object of the present invention to provide a live bait dispenser having means for varying the size of the dispenser upon demand.

These and other objects of the present invention will be more apparent from the following description of the preferred embodiment.

BRIEF DESCRIPTIONS OF THE DRAWINGS

A better understanding of the nature and operation of the embodiments of the present invention will be achieved with the following description of the invention taken in conjunction with the appended drawings, wherein;

FIG. 3 is a third embodiment of the apparatus of the present invention, with means provided for amending the size of the dispenser housing.

FIG. 4 is a detailed cross-sectional view of sleeve used in the embodiment of FIG. 3.

FIGS. 5 and 6 are detailed views of alternative embodiments of an end portion of the dispensing conduit.

DETAILED DESCRIPTION OF THE PREFERRED EMBODIMENT

Figure 1:
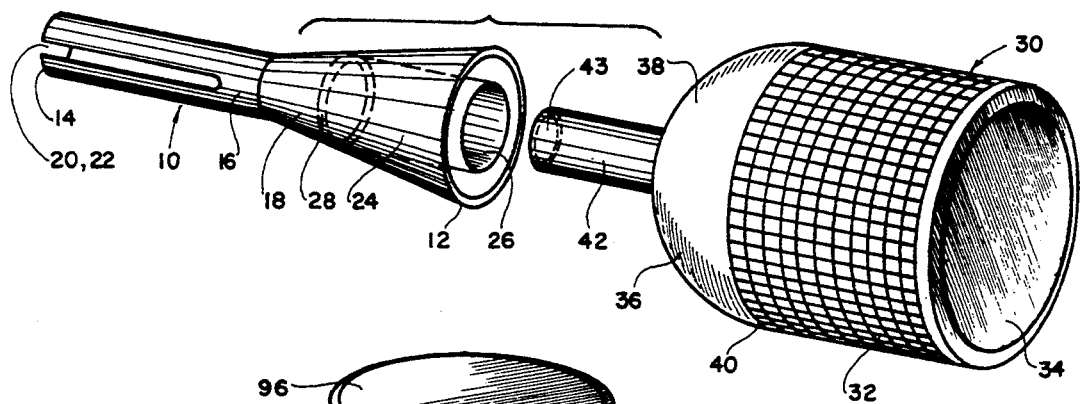
FIG. 1 is a perspective view of a first embodiment of the present invention.

Reference will now be made to the drawings, wherein like parts are designated by like numerals, and wherein numeral 10 designates an attachment to a live bait dispenser in accordance with the first embodiment of the present invention. The attachment 10 has an attachment end 12 and a dispensing end 14 opposite the end 12. The attachment 10 is formed with a cylindrical portion 16 integrally connected to a frustoconical portion 18. The cylindrical-portion 16 is formed with a pair of opposing longitudinal slots 20 and 22 which extend from the end 14 to a distance inwardly, towards the mid-section of attachment 10. The portion 18 is formed substantially hollow, similar to the portion 16 and has mounted therein an attachment means 24, which is provided with a cylindrical sleeve 26 and an annular retaining ring 28. The ring 28 is frictionally fitted within the chamber formed by the hollow conical portion 18 and thereto carries the cylindrical sleeve 26 fixedly attached thereto. The sleeve 26 has an outside diameter substantially smaller than the internal diameter of the end portion 12 and an internal diameter just slightly greater than an outside diameter of a dispensing end of the live bait dispenser, the purpose of which will be explained hereinafter. A container housing 30 is currently available on the market and is provided with a cylindrical body 32 having two open ends. One of the open ends is closed by a removable cap 34 and allows admission of live bait into the hollow housing 32. The opposite end of the housing 32 is fitted with a dispensing portion 36 which has a wider portion 38 which fits on the end 40 of the housing 32 and a cylindrical portion 42 integrally connected to the part 38. The cylindrical part 42 has an opening 43 through the center thereof, communicating with the part 38 and with the remainder of the housing 32. The outside diameter of portion 42 is slightly less than the interior diameter of the cylindrical portion 26 of the sleeve 24.

When it is necessary to provide the commercially available dispenser 30 with a convenient dispensing attachment, all that is required is to frictionally fit the attachment 10 to the portion 42 of the dispenser 30 in overlapping surrounding relationship, thus connecting the attachment 10 to the dispenser 30. It may be necessary to glue the parts 42 and 26 together, depending on the fisherman's decision to keep the attachment 10 permanently secured to housing 30.

In this manner, the fisherman who purchased a dispenser 30 and has found disadvantages of retrieving live bait from the closed cylindrical, portion 42 will have an advantage of fitting the dispenser with the dispensing attachment conduit in accordance with the present invention, which, at the dispensing end 14 is provided with hingedly opening door means, allowing the retention of the live bait within the conduit until such time as the live bait needs to be hooked and retrieved from thee dispensing attachment 10. The hinge operated door mentioned can be better seen in FIGS. 5 and 6. Referring to FIG. 6, the dispensing conduit 16 is seen in its detailed view, looking from the end 14 inwardly, towards the conical portion 18. As can be seen in FIG. 6, the end 14 is provided with slots 20 and 22 which extend from the end 14 inwardly towards the portion 18. The line defining an interior conduit 54 follows the general circular form, while it is cut straight along the hinge line 50. Attached to the hinge line 50 of the interior wall which defines the conduit 54 is a hingedly attached door means 60 which has a generally circular shape having a matching straight bottom part 62 adapted for hingedly connecting to the hinge line 50. Formed through the door 60 is a slot 64 which extends through the entire diameter of the door 60 and is substantially equal to the size and shape of the corresponding slots 20 and 22. The door means 60 is formed with two portions 66 and 68, respectively, each securely attached along the line 50 to the wall 52 of the portion 16. The door means 60 is normally in its closed position, substantially covering the conduit 54, with exception of the slot 64, which is designed to be too narrow to allow a live bait to escape therethrough.

When it is necessary to extract a live bait from the conduit 54, a hook is forced through the slot 20, hooking the live bait which has advanced to the door means 60 and was stopped by the obstacle of the door. By moving the hook, with the live bait caught thereon towards the end 14, the door portions 66 and 68 are forced open, hingedly moving downwardly and allowing the live bait to be extracted from the conduit 16. The door portions 66 68 then spring back to their closed position.

One of the advantages which such design provides is the ability for the manufacturer to mold longer doors, thus substantially reducing the cost of the production.

Another embodiment of the hingedly opening doors is illustrated in FIG. 5. Similarly to the view of FIG. 6, the drawing illustrates a cylindrical portion 16 in more detail, with the part of the portion 18 being cut-away.

As can be seen in FIG. 5, the dispensing end 14 is provided with a pair of hingedly attached door sections 70 and 72 which form a part of the door means 74. The end 14 in this embodiment, is cut at an angle, with the cut beginning from the end 14, through the side wall 15 of the portion 16 to a distance inwardly. Therefore, hinged lines 76 and 78 of the door portions 70 and 72, respectively, are formed a distance from the end 14. The door portions 70 and 72 are substantially convex shaped and are sized in such a manner as to be substantially equal or slightly greater than the width of the end portion 14. The normally closed position of the door portions 70 and 72 closes the entrance to the conduit formed by the hollow interior of the portion 16, thus preventing a live bait from escaping from the conduit 16 during storage. When it is required to remove the individual live bait from the dispensing conduit 16, a hook is forced into the slot 20, catching the live bait which has reached the end 14 of the dispensing conduit and, by moving the live bait towards the end 14, the door portions 70 and 72 are forced open, allowing them to hinge along lines 76 and 78, and permitting withdrawal of the individual live bait from the dispensing portion 16. The door portions 70 and 72 then spring back and return to their closed position.

Figure 2:
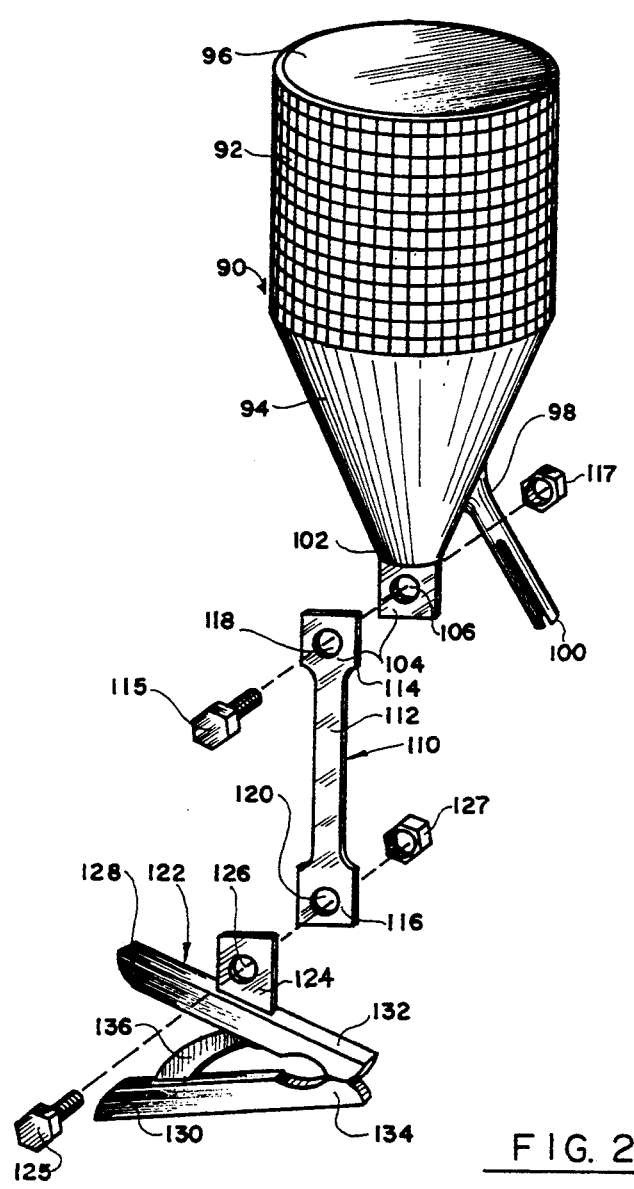
FIG. 2 is a perspective, exploded view of a second embodiment of the apparatus in accordance with the present invention, adapted for mounting on a side of a boat.

Reference will now be made to FIG. 2 illustrating the second embodiment of the live bait dispenser in accordance with the present invention. As shown in FIG. 2, a live bait dispenser 90 has an upper substantially cylindrical portion 92 and a lower frustoconical portion 94 connected at its base to the matchingly sized cylindrical portion 92. The top of the housing 90 is fitted with a closing cap 96 which is removably attached to the top edge of the portion 92 and allows positioning of the live bait in the dispenser 90, while retaining the live bait within the housing.

Fixedly attached to the portion 94 and at an angle to the vertical portion thereof is a dispensing conduit 98 which is in communication with the interior of the housing 90. The end portion 100 of the conduit 98 can be fitted with hingedly attached doors, similar to the doors shown in FIGS. 5 and 6, if desired. The bottom of the portion 94, designated by numeral 102 in the drawing is provided with an attachment plate 104 which can be a square metal plate having an opening 106 through the center thereof. The dispenser 90 is provided with attachment means 110 which allow attachment of the dispenser 90 to a side of a boat. The attachment means 110 provides for the use of an elongated arm 112 which has a pair of attachment plates 114 and 116 at the opposite ends thereof. The attachment plate 114 has an opening 118 therethrough and sized and shaped substantially similar to the opening 106 of the attachment plate 104.

By forcing a bolt 115 through the opening 118 and a co-aligned opening 106, the arm 112 is attached to the dispenser 90 and secured on the opposite by a conventional nut 117. The end 116 of the arm 112 is provided with an opening 120 which will allow connection of the arm 112 to a spring clamp 122. The clamp 122 has an attachment plate 124 which is formed with an opening 126 allowing secure attachment of the spring clamp 122 to the arm 112 through the use of conventional bolt 125 and nut 127 combination.

The spring clamp 122 has handle portions 128 and 130 and gripping portions 132 and 134. The portions 128, 130 and 132 and 134 are connected together by compression spring 136 which retains the gripping portions 132 and 134 in close proximity to each other unless they are forced open by compressing portions 128 and 130. The gripping portions 132 and 134 are designed to be mounted on a side of a boat, on a pole or other suitable object, so that the dispenser 90 is retained in close proximity to the fisherman without the danger of being separated from the fisherman by a great distance.

When necessary, the angle of positioning of dispenser 90 can be easily changed by rotating the dispenser 90 about an axis formed by a bolt 115 which is designed to be passed through the respective holes 118 and 106. A similar angular arrangement can be achieved by rotating the arm about an axis formed by a bolt 125 which is passed through the openings 120 and 126.

Alternatively, the spring clamp 122 can be substituted by a vise clamp, C-clamp, or a flexible plastic clamp carrying a means for securing it to the arm 112.

Reference will now be made to FIG. 3 illustrating still further embodiment of the apparatus in accordance with the present invention, wherein a dispenser with expandable features is illustrated.

As can be seen in FIG. 3, the dispenser 200 has a central housing 202, a sleeve 204 coaxially mounted over the housing 202 and a bottom portion 206. The housing 202 is of a generally cylindrical configuration and is provided, on its bottom and top portions each with a securing band 208 and 210. Each of the bands 208 or 210 is angularly shaped to follow the circumference of the cylindrical portion 202 and is formed with a pair of outwardly extending lips 212. The band 208 has a groove 214 formed between the outwardly extending lips 212. Similarly, the band 210 is formed with a groove between the outwardly extending lips 112.

The sleeve 204 has a generally cylindrical form and interior diameter slightly greater than the diameter of the annular lips 212. Fixedly attached to the bottom of the sleeve 204 is a securing band 216. The band 216 has an outer smooth surface and interior surface which is formed with two depressions 217 and 219 therein. Formed between the two depressions is a lock 218 which is sized and shaped to fit within the grooves 214 of the bands 208 or 210.

It is preferable that the bands 208 and 210 are formed from a flexible, compressible material, so that when the sleeve 204 is moved downwardly, it compresses upper lip 12 of the band 208 to move the lock 218 into the groove 214. By continuous downward movement the bottom of the band 216 is forced below the lower lip 212 such that depression 219 received lower lip 212, while the depression 217 receives the upper lip 212 of the band 208. In this manner, the size of the interior chamber of the housing which is designed to retain live bait can be decreased, thus allowing fewer live baits to be retained therein.

When it is necessary to increase the size of the interior chamber, the sleeve 204 is moved upwardly, forcing the lock 218 to "snap" into the respective groove 214 of the band 210, thus retaining the sleeve 204 in this position, until such time as the size of the container needs to be changed again.

The upper border of the sleeve 204 is fitted with a perpendicularly attached to its vertical axis horizontal rim 220 which extends about the edge of the sleeve 204 to a distance inwardly, towards the center thereof. Attached to the interior edge 222 of the rim 220 is interior sleeve 228 which extends downwardly and at an angle to the edge 222 of the rim 220. The upper end of the sleeve 228 is left open, allowing positioning of the live bait through the opening into the housing of the dispenser 200. The interior surface of the sleeve 228, as well as its exterior surface are made of preferably smooth material, so as to prevent the live bait from crawling out of the dispenser 200 along the walls of the sleeve 228.

The bottom portion 206 is formed of a general hemispherical, or may be frustoconical shape, having the widest portion of it attached to the cylindrical portion 202. Fixedly attached at its most narrow portion is an attachment plate 226 which allows the dispenser 200 to be attached to an arm, similar to the arm 112 and thus to a clamp means, similar to the embodiment shown on FIG. 2. Integrally attached to the lower part of the portion 206 is a live bait dispensing conduit 230 which gradually reduces in diameter from its attachment end 232 towards its dispensing end 234. In this manner, the crickets or other live bait will crawl into the dispensing conduit 230 and be trapped in the narrow end 234 without the ability to turn back and crawl out of the dispensing conduit. The end 234 of the dispensing conduit can be provided with hinged doors shown in FIGS. 5 or 6, when desired and with slots 236.

The body of the dispensing conduit can be made of wire mesh or other similar material allowing air circulation within the housing, so as to keep the live bait alive for a long period of time during fishing. The other portions of the dispensing containers can be made of molded plastic, (formed by, for example, injection molding), or other similar material, so as to reduce the cost of manufacturing of the product and make it more attractive to the buyers. Additionally, it is envisioned that the sleeve 228 is made of smooth, solid plastic, so as to prevent escape of the live bait as was described above.

The arm 112 and the spring clamp 122 can be made of metal or of plastic, as desired, the main requirement being the ability of the arm to retain its elongated shape without bending when the dispenser 90 or 200 is attached thereto.

Numerous modifications of the preferred embodiment described herein can be made by those skilled in the art without departing from the spirit and scope of the present invention. Therefore I pray that my rights to the invention be limited only by the scope of the appended claims.

I claim:

1. A dispensing attachment device for use with a live bait dispenser having a dispensing conduit means, said device comprising:

a main body having a substantially hollow interior, an open securing end and open dispensing end, said dispensing end being sized and shaped to retain a single cricket in position ready for dispensing without application of a compression force on said cricket, said dispensing end being provided with at least one longitudinal slot extending a distance from said dispensing end inwardly towards said securing end, said longitudinal slot being continuously open during entire operation of the device; and a means for selectively manually detachably securing the dispensing attachment device to a live bait dispenser, said securing means being mounted within the interior of the main body adjacent to said securing end, said securing means being internally adapted for mounting on said dispensing conduit means in at least partial overlappingly covering co-axial relationship to said dispensing conduit means.

2. The device of claim 1, wherein said securing means comprises a hollow sleeve securely attached to an annular retaining ring, said ring being frictionally fitted within said interior of the main body, said sleeve being adapted for receiving the dispensing conduit means.

3. The device of claim 2, wherein said retainer ring is mounted within said main body a distance from said securing end.

4. The device of claim 1, wherein said dispensing end carries a spring door means hingedly attached to said body in normally covering relationship to said open dispensing end.

5. A dispensing attachment device for use with a live bait dispenser having a dispensing conduit means, said device comprising:

a main body having a substantially hollow interior, and open securing end, and an open dispensing end, said dispensing end being sized and shaped to retain a single cricket in position ready for dispensing without application of a compression force on said cricket, wherein said main body comprises a substantially cylindrical dispensing portion and a substantially frustoconical securing portion integrally attached to said dispensing portion at its smaller diameter part, said dispensing portion being provided with a pair of opposing longitudinal slots extending a distance from said dispensing end inwardly towards said securing end; and a device securing means mounted within the interior of the main body adjacent to said securing end, said securing end means being internally adapted for mounting on said dispensing conduit means in at least partial overlappingly covering co-axial relationship to said dispensing conduit means.

6. A dispensing attachment device for use with a live bait dispenser having a dispensing conduit means, said device comprising:

a main body having a substantially hollow interior, an open securing end, and a dispensing end provided with a slot which is continuously open during entire operation of the device, said dispensing end being sized and shaped to retain a single cricket without application of a compression force on said single cricket, said dispensing end being provided with a tension spring door means attached to said body in at least partially covering relationship to said open dispensing end, wherein said tension spring door means comprises a pair of door portions hingedly connectable to said dispensing end, said door portions being movable between a closed position and an open position in response to a force applied by said single cricket being withdrawn from the dispensing end; and a means for selectively detachably securing the dispensing attachment device to the live bait dispenser.

7. A dispensing attachment device for use with a live bait dispenser having a dispensing conduit means, said device comprising:

a main body having a substantially hollow interior, an open securing end and an open dispensing end, said dispensing end being provided with a pair of opposing longitudinal slots extending a distance from said dispensing end inwardly toward said securing end, said dispensing end carrying a spring door means hingedly attached to said body in normally covering relationship to said open dispensing end, said spring door means comprising a pair of door portions hingedly attached to the dispensing end on perpendicularly opposite sides from said slots and movable between a normally closed position and an open position in response to a force applied by a live bait being withdrawn through the dispensing end, said door means moving about hinge lines parallel to the plane extending through the slots; and a device securing means mounted within the interior of the main body adjacent to said securing mend, said securing means being internally adapted for mounting on said dispensing conduit means in at least partial overlappingly covering co-axial relationship to said dispensing conduit means.

8. A live bait dispenser, comprising:

a housing adapted for receiving and retaining a plurality of crickets in an interior chamber formed in the housing; and at least one dispensing conduit means attached to the housing, one open end of the dispensing conduit means communicating with the interior chamber of the housing for admitting the crickets into the dispensing conduit means, and the second end of the dispensing conduit means being provided with a tension spring operated door means to prevent escape of the crickets from the dispensing conduit means while allowing withdrawal of a single cricket from the dispensing conduit means, said dispensing end being provided with a slot which is continuously open during entire operation of the dispenser, said dispensing end being sized and shaped to retain said single cricket without application of a compression force on said single cricket.

9. A live bait dispenser, comprising:

a housing for receiving a plurality of crickets; and a bait dispensing attachment detachably connectable to said housing in bait receiving relationship thereto, said bait dispensing attachment being provided with at least one bait dispensing conduit adapted for trapping a single cricket within a dispensing area, while preventing other crickets from reaching the dispensing area when the individual cricket is located within the dispensing area, said bait dispensing conduit trapping the single cricket without application of a compression force on said single cricket, said dispensing conduit being provided with a slot which is continuously open during entire operation of the dispenser.

* * * * *